United States Patent [19]

Sakashita et al.

[11] Patent Number: 5,388,168
[45] Date of Patent: Feb. 7, 1995

[54] PICTURE QUALITY IMPROVING CIRCUIT USING A CUMULATIVE HISTOGRAM

[75] Inventors: Hirohiko Sakashita, Nara; Naoji Okumura, Ninoo, both of Japan

[73] Assignee: Matsushita Electric Industrial Co., Ltd., Osaka, Japan

[21] Appl. No.: 84,064

[22] Filed: Jun. 30, 1993

Related U.S. Application Data

[63] Continuation-in-part of Ser. No. 786,822, Nov. 1, 1991, abandoned.

[30] Foreign Application Priority Data

Nov. 19, 1990 [JP] Japan ................... 2-313542

[51] Int. Cl.$^6$ ................................ H04N 5/20
[52] U.S. Cl. ..................... 382/54; 382/51; 348/672; 358/455
[58] Field of Search ............... 382/51, 54; 348/672, 348/678, 674, 254, 625; 358/455, 461; H04N 5/20, 5/202

[56] References Cited

U.S. PATENT DOCUMENTS

| | | | |
|---|---|---|---|
| 3,979,555 | 9/1976 | Opittek et al. | 348/672 |
| 4,337,514 | 6/1982 | Favreau et al. | 348/674 |
| 4,450,482 | 5/1984 | Ackermann | 348/672 |
| 4,682,229 | 7/1987 | Coates et al. | 348/672 |
| 4,783,698 | 11/1988 | Harney | 358/428 |
| 4,899,216 | 2/1990 | Tatsumi et al. | 358/521 |
| 5,053,888 | 10/1991 | Nomura | 358/458 |
| 5,157,517 | 10/1992 | Byrne et al. | 358/452 |
| 5,296,941 | 3/1994 | Izawa et al. | 382/51 |

FOREIGN PATENT DOCUMENTS

0034737A1 9/1981 European Pat. Off. .
2452216 10/1980 France .

Primary Examiner—Leo H. Boudreau
Assistant Examiner—Larry J. Prikockis
Attorney, Agent, or Firm—Stevens, Davis, Miller & Mosher

[57] ABSTRACT

A picture quality improving circuit for automatically obtaining a corrected image by capturing features of the input video signals. The circuit first compares an input luminance signal with a plurality of reference values, measures the results of the comparison by a plurality of counters and obtains a cumulative histogram within a predetermined period of time. Next, the cumulative histogram signals are stored in a latch circuit for a predetermined period of time, and an interpolation circuit determines and outputs a correction signal corresponding to the input luminance signal by interpolating the cumulative histogram. Accordingly, when a large number of dark signals exist in the input luminance signal, the cumulative histogram signals will describe an upwardly projecting graph, and the dark portions of the signal will be extended in a bright direction. Thereby, the picture quality can be improved.

8 Claims, 5 Drawing Sheets

PICTURE QUALITY IMPROVING CIRCUIT USING A CUMULATIVE HISTOGRAM

This is a continuation-in-part of U.S. Ser. No. 07/786,822, filed Nov. 1, 1991, now abandoned.

BACKGROUND OF THE INVENTION

This invention relates to a picture quality improving technique for automatically obtaining an optimum image by capturing the characteristics of an input image in video signal handling apparatus, such as television receivers, VCRs, etc, and particularly in apparatus for digitally processing signals in a video chromatic signal processing circuit.

Digitization of video signal handling apparatus signals has made steady progress in recent years and this trend has also spread to home and private-use apparatus, such as television receivers and VCRs. This technique is used to reduce the number of necessary components and to improve reliability. Moreover, since a video chromatic signal processing circuit in particular, can be easily developed for EDTV via digitization, this technique is believed to be very promising.

In analog television, on the other hand, remarkable progress has been made and very clear images can be reproduced, as well.

However, both analog television and digital television use cathode-ray tubes (CRT), which are the most typical display devices at present. However, the dynamic range of a CRT is extremely narrow in comparison with natural light. This narrowness in the dynamic range of the display capacity imposes various limitations on the video system, such as blooming which occurs in a scene where luminance signals are bright, and the problem that black gradation cannot be accurately expressed in a dark scene.

SUMMARY OF THE INVENTION

To solve the problems described above, a cumulative histogram circuit as shown in FIG. 1 comprises at least (n−1) comparison circuits for inputting a digitally encoded input signal of i bits and comparing it with at least (n−1) reference values which are different from each other, respectively; and at least (n−1) counters for inputting the output signals of the comparison circuits and carrying out a count-up operation when the reference values are greater than the input luminance signal, respectively; wherein the comparison operations are carried out up to a predetermined number of times to obtain cumulative histogram values which represent a cumulative histogram of the outputs of the counters.

A picture quality improving circuit, as shown in FIG. 2, comprises a first selector for inputting n signals, that is, the maximum value of an input luminance signal and first to (n−1)th cumulative histogram values, and selecting any one of the n signals by using the upper m bits of the i bits of the input luminance signals as a control signal; a second selector for inputting the signals of first to (n−1)th cumulative histogram values and a minimum value of an input luminance signal, and selecting any one of the n signals by using the upper m bits of the i bits of the input luminance signal as a control signal; a subtraction circuit for inputting the output signal of the first selector and the output signal of the second selector and calculating their difference; bit shifting means for shifting each bit of the difference in a lower direction by a predetermined number (e.g. 6) of figures; a multiplication circuit for inputting the lower (i−m) bits of the input luminance signal and the output signal of the bit shifting means, and multiplying them; and an addition circuit for adding the output signal of the multiplication circuit and the output signal of the second selector.

A picture quality improving circuit as shown in FIG. 3 comprises a cumulative histogram circuit for inputting a digitally encoded input luminance signal and obtaining a cumulative histogram; a latch circuit for temporarily storing the histogram signal obtained by the cumulative histogram circuit; and an interpolation circuit for inputting the input luminance signal as well as the output histogram signal of the latch circuit and interpolating the input signal into a line graph similar to the histogram signal.

According to the construction of FIG. 1, luminance components of an input luminance signal as a cumulative histogram can be detected.

According to the construction of FIG. 2, an interpolation circuit which corrects a luminance signal in real time by the information of the cumulative histogram is provided.

According to the construction of FIG. 3, the cumulative histogram of the input luminance signal is directly calculated, which enables operation in real time in the interpolation circuit on the basis of the calculation result and correction of picture quality by displaying the result of the operation.

According to the invention, a picture quality improving circuit comprises: (1) means for receiving a continuous input signal having a level variable within a predetermined range; (2) means for obtaining a cumulative histogram of the input signal, the cumulative histogram representing relationships between each of a plurality of selected possible levels of the input signal and possible future levels of the input signal which are less than each of the selected possible levels, the histogram including histogram values indicative of the relationships, each of the histogram values corresponding to a respective one of the selected possible levels; (3) a first selector for receiving the input signal and determining a first one of the selected possible levels which is greater than and closest to a level of the input signal and outputting a first one of the histogram values corresponding to the level of the first one of the selected possible levels; (4) a second selector for receiving the input signal and determining a second one of the selected possible levels which is less than or equal to a level of the input signal and outputting a second one of the histogram values corresponding to the level of the second one of the selected possible levels; and (5) calculation means for calculating a level of a corrected signal corresponding to the input signal by interpolating the level of the input signal between the first and second ones of the histogram values.

Also according to the invention a picture quality improving circuit comprises: (1) means for receiving a continuous input signal having a level variable within a predetermined range; (2) a cumulative histogram circuit for obtaining a cumulative histogram of the input signal, the cumulative histogram representing relationships between each of a plurality of selected possible levels of the input signal and possible future levels of the input signals, which levels are less than each of the selected possible levels, the histogram including histogram values indicative of the relationships, each of the histogram values corresponding to a respective one of the selected possible levels; (3) storing means for temporarily storing the histogram values; and (4) an interpolation circuit for receiving the input signal and the histogram values from the storing means and calculating a level of a corrected output signal corresponding to the input signal by interpolation as a value corresponding to the level of the input signal with respect to the cumulative histogram.

DESCRIPTION OF THE PREFERRED EMBODIMENTS

Figure 1:
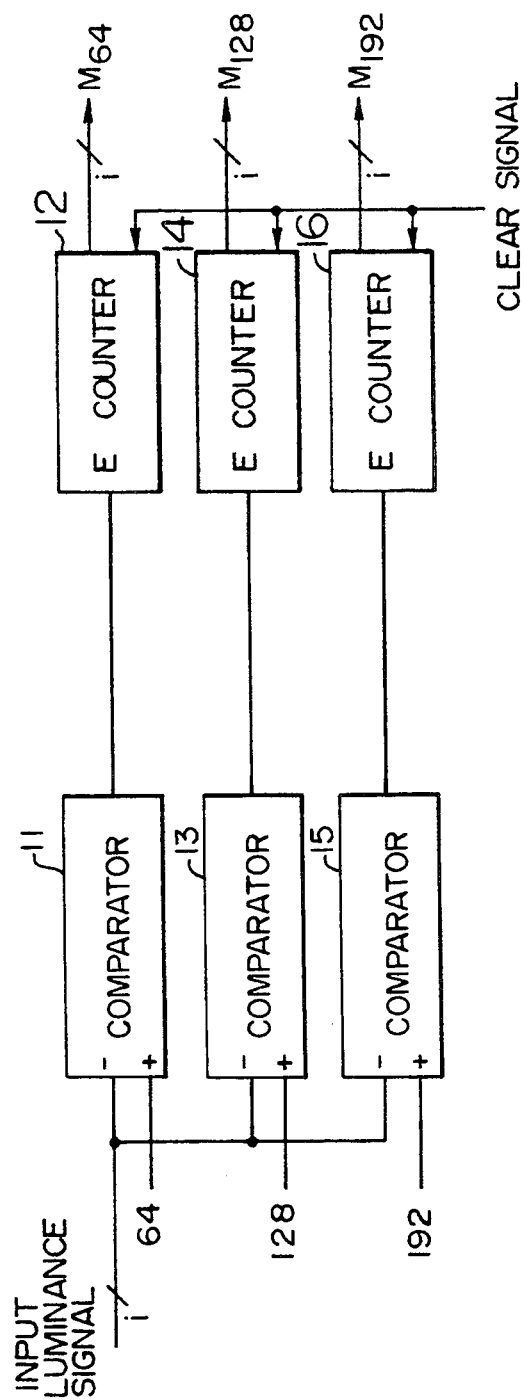
FIG. 1 is a block diagram of a cumulative histogram circuit according to a first embodiment of the present invention.

Hereinafter, a cumulative histogram circuit in an embodiment of the present invention will be explained with reference to the accompanying drawings. FIG. 1 is a block diagram showing a cumulative histogram circuit. To simplify the description, this embodiment will be explained with respect to the case where the distribution of a luminance signal is divided into four parts to obtain three histograms and interpolation is made between the four parts.

In FIG. 1, reference numeral 11 denotes a first comparison circuit which receives a digitally encoded i-bit (e.g. 8 bits) input luminance signal and compares this input luminance signal with a certain first reference value (64). Reference numeral 12 denotes a first counter which receives the output signal of the first comparison circuit 11 and performs a count-up operation when the first reference value (64) is greater than the value of the input luminance signal. Reference numeral 13 denotes a second comparison circuit which receives the input luminance signal and compares the input luminance signal with a certain second reference value (128). Reference numeral 14 denotes a second counter which receives the output signal of the second comparison circuit 13 and performs a count-up operation when the second reference value is greater than the value of the input luminance signal. Reference numeral 15 denotes a third comparison circuit which receives the input luminance signal and compares the input luminance signal with a certain third reference value (192). Reference numeral 16 denotes a third counter which receives the output signal of the third comparison circuit 15 and performs a count-up operation when the third reference value is greater than the value of the input luminance signal.

The operation of the cumulative histogram circuit having the construction described above will be explained with reference to FIG. 1.

Figure 4:
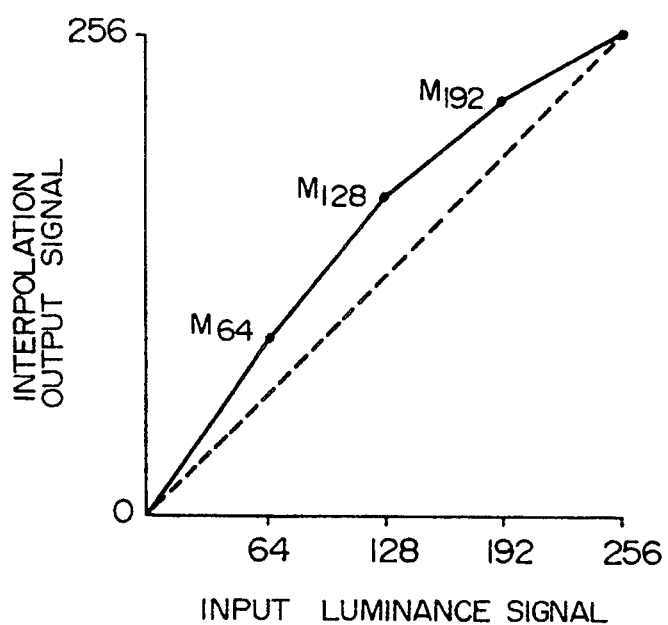
FIG. 4 is a characteristic diagram useful for explaining the input signal from the cumulative histogram circuit in FIG. 2.

To begin with, the input luminance signal is inputted to the three comparison circuits 11, 13 and 15, respectively. Assuming that the input luminance signal is 100, for example, the first comparison circuit 11 outputs 0 because the input luminance signal is greater than the reference value (64), but the second and third comparison circuits 13 and 15 would output 1 because the input luminance signal is smaller than the second and third reference values, respectively. Therefore, although the first counter 12 does not perform its count-up operation, the second and third counters 14, 16 do perform the count-up operation. Assuming that the input luminance signal is an 8-bit signal and a fourth counter for counting an output signal of a fourth comparison circuit is provided in the circuit of FIG. 1 with a comparison value of 256, upon sampling of the input luminance signal 256 times, the output of the fourth counter would necessarily be equal to 256. This is true since the value 256 is higher than any possible level of an 8-bit input luminance signal. Accordingly, after sampling of the input luminance signal has been executed 256 times in this embodiment, the outputs of each counter plus the values 0 and 256 would represent a cumulative histogram of the input luminance signal, such as shown in FIG. 4.

As described above, the picture quality improving circuit of this embodiment comprises the first comparison circuit which receives the digitally encoded 8-bit (i) input luminance signal and compares it with a certain reference value, the first counter which receives the output signal of the first comparison circuit and performs its count-up operation when the first reference value (64) is greater than a value of the input luminance signal, the second comparison circuit which receives the input luminance signal and compares it with a certain second reference value (128), the second counter which receives the output signal of the second comparison circuit 13 and performs its count-up operation when the second reference value is greater than a value of the input luminance signal, the third comparison circuit which receives the input luminance signal and compares it with a certain reference value (192), and the third counter which receives the output signal of the third comparison circuit 15 and performs its count-up operation when the third reference value is greater than a value of the input luminance signal. Therefore, the outputs of the counters represent the cumulative histogram by effecting the comparison operation up to a predetermined number of times.

After the cumulative histogram has been latched, the counters 12, 14, and 16 may be selectively cleared so as to obtain a new cumulative histogram by activating a clear signal pin as shown in FIG. 1. In other words, the clear signal is used to reset counters 12, 14, 16 when comparison circuits 11, 13, 15 have effected the comparison operation the predetermined number of times as described above. Before counters 12, 14, 16 are reset, their counts are latched by latch circuit 32 (see FIG. 3).

Figure 2:
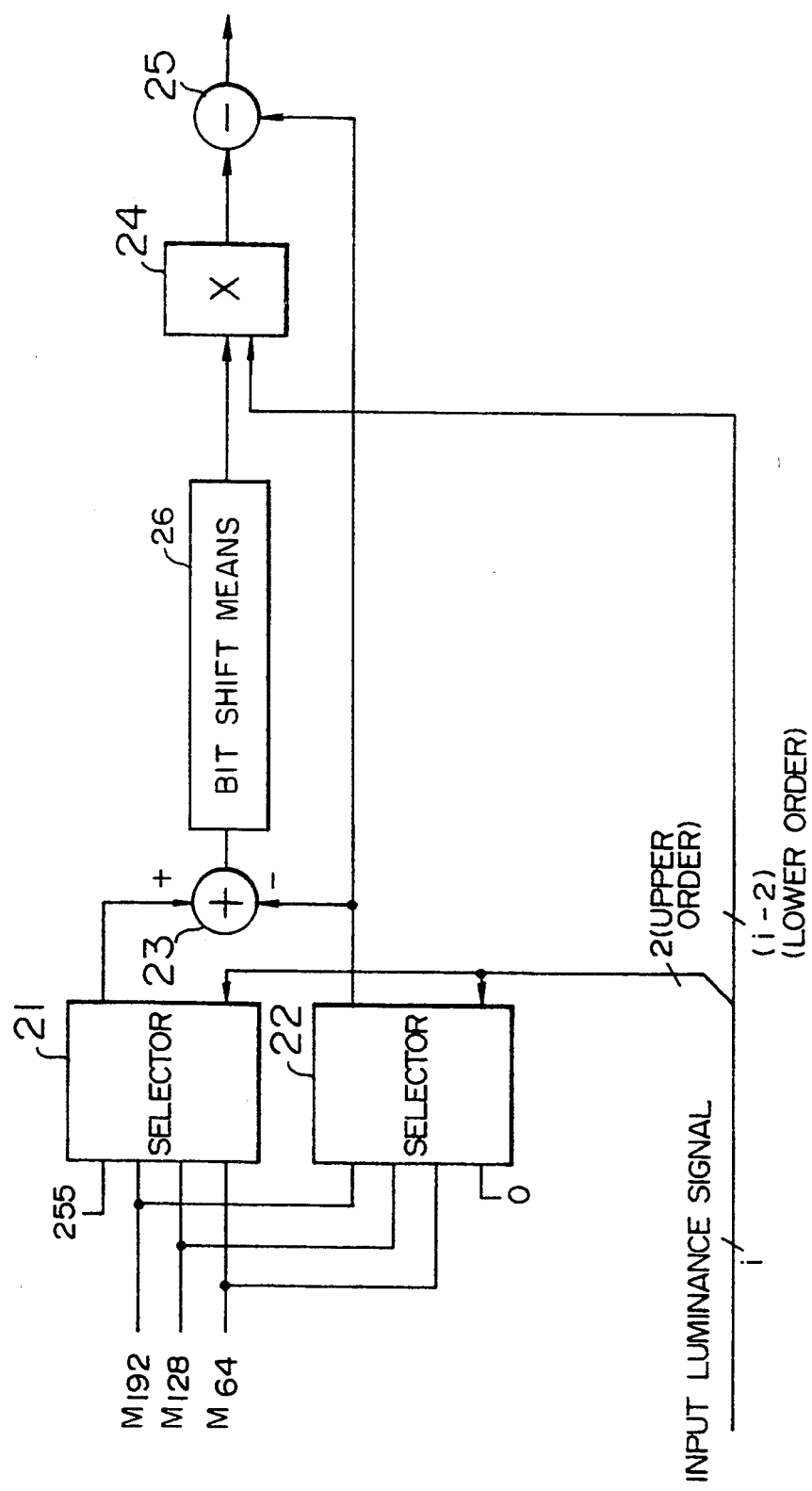
FIG. 2 is a block diagram of an interpolation circuit according to a second embodiment of the present invention.

Next, the second embodiment of the present invention will be explained with reference to the drawings. FIG. 2 is a block diagram of an interpolation circuit.

In FIG. 2, reference numeral 21 denotes a first selector which receives n signals, that is, the value 255 (255 is used instead of 256 so that the circuit may be realized in 8 bits) and first and second cumulative histogram values to (n−1)th cumulative histogram values and selects any of the n signals by using the upper m bits (e.g. two) of the i bits of the input luminance signal as a control signal. Reference numeral 22 denotes a second selector which receives n signals, that is, the first, second to (n−1)th signals of the cumulative histogram values and the value 0 and selects any of the inputs by using the upper m bits of the i bits of the input luminance signal as a control signal. Reference numeral 23 denotes a subtraction circuit which receives the output signal of the first selector 21 and that of the second selector 22 and calculates their difference. Reference numeral 26 denotes a bit shifter which shifts each bit of the difference in the lower direction by a predetermined number of figures, such as six. Reference numeral 24 denotes a multiplication circuit which receives the lower (i−m) bits of the input luminance signal as well as the output signal of bit shifter 26 described above, and carries out multiplication between them. Reference numeral 25 denotes an addition circuit which adds the output signal of the multiplication signal 24 to the output signal of the second selector 22.

The operation of the interpolation circuit having the construction described above will be explained with reference to FIGS. 2 and 4.

First of all, the numeric value which needs to be interpolated will be explained with reference to FIG. 4.

In FIG. 4, the abscissa represents the input luminance signal and the ordinate represents the amplitude of the output signal of the interpolation circuit. In this diagram, the dotted line represents the original characteristics and the solid line represents the interpolation characteristics which need to be obtained.

Assuming that the input luminance signal is 100, its output value y can be obtained by the following equation (1) using the values $M_{64}$ and $M_{128}$ before and after the input luminance signal value 100 among the calculation results of the histograms:

$$y = \frac{M_{128} - M_{64}}{128 - 64} \times (100 - 64) + M_{64} \qquad (1)$$

In the equation given above, (128−64) of the denominator is always 64 and constant in other regions, too. Since the region of distribution is divided into four parts in this embodiment, the denominator can be replaced by 64. This can be achieved by a hardware construction (such as bit shifter 26) so as to shift six bits to lower bits.

Next, an example in which the equation described above is executed will be explained with reference to FIG. 2.

In FIG. 2, the upper 2 (i.e. m) bits of the i bits of the input luminance signal are first taken out in order to detect in which of the following ranges the level of the input signal exists:

(0–63, 64–127, 128–191, 192–255)

For, since the region is divided into four parts, it is possible to know in which region the numeric value exists, by referring to the upper 2 bits.

If the input signal is 100, for example, the upper two bits in binary code becomes 01b. The suffix "b" represents that the numeric value is expressed in binary code. At this time, the first selector 21 selects $M_{128}$ and the second selector 22 selects $M_{64}$. The subtraction circuit 23 carries out subtraction between the output signal of the first selector 21 and the output signal of the second selector 22, and executes $M_{128} - M_{64}$ of equation (1). Next, the output of the subtraction circuit 23 is shifted by six bits to the right (i.e. toward the lower bits) such that the most significant six bits are replaced by "O's", and is then inputted as one of the inputs of the multiplication circuit 24. The lower six bits of the input luminance signal are inputted as the other input of the multiplication circuit 24, and multiplication is carried out between them. These operations accomplish the division by (128−64) and the subtraction (100−64) in the first term of the equation (1). Next, the output signal of the multiplication circuit 24 is inputted as one of the inputs of the addition circuit 25 and the value $M_{64}$ is inputted as the other so as to carry out addition between them. In this way, the addition of the second term of the equation (1) is achieved.

As described above, this embodiment can obtain the interpolated output in real time by the use of the result of cumulative histograms.

Figure 3:
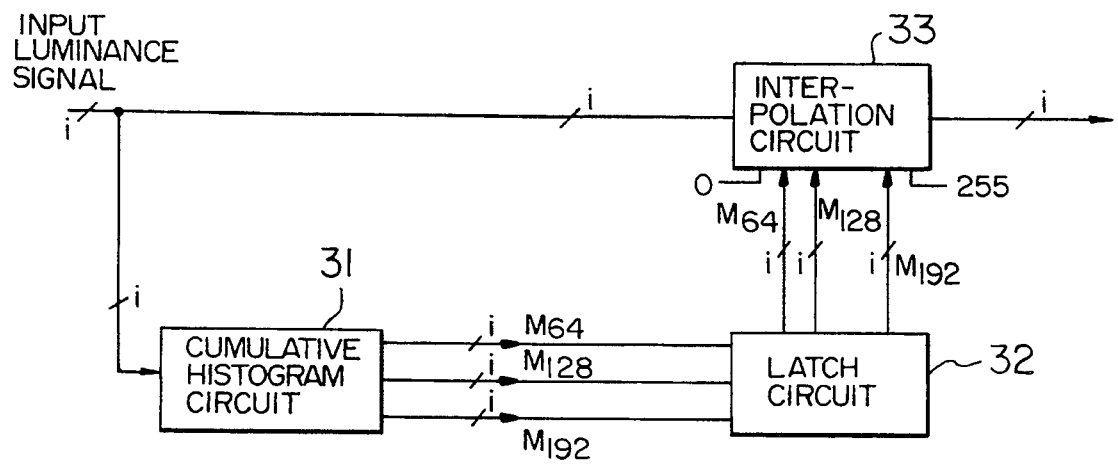
FIG. 3 is a block diagram of a picture quality correction circuit according to a third embodiment of the present invention.

The third embodiment of the present invention will now be described with reference to the drawings. FIG. 3 is a block diagram showing a picture quality improving circuit.

Referring to FIG. 3, a cumulative histogram circuit receiving a digitally encoded input luminance signal for obtaining a cumulative histogram is represented by reference numeral 31. A latch circuit for temporarily storing the histogram signal obtained by the cumulative histogram circuit 31 is represented by reference numeral 32. An interpolation circuit receiving the input luminance signal and the output histogram signal of the latch circuit 32 for interpolating the input signal into a line graph similar to the histogram signal is represented by reference numeral 33.

The picture quality improving circuit having the construction described above operates in the following way.

The input luminance signal is inputted to the cumulative histogram circuit 31 to obtain the cumulative histogram of the input luminance signal. The output signal of the cumulative histogram circuit 31 is inputted to the latch circuit 32, which keeps this value until the cumulative histogram circuit 31 executes the next operation and outputs its output signal.

On the other hand, the input luminance signal is inputted to the interpolation circuit 33 and its value is corrected by the use of the cumulative histogram outputted by the latch circuit 32. This correction operation is carried out in real time by effecting interpolation by the use of the data of the cumulative histogram.

Generally, the present invention operates as follows. Initially, cumulative histogram circuit 31 is cleared. The input luminance signal is then sampled 256 times by histogram circuit 31 so as to obtain a cumulative histogram. Thus, it takes 256 samples to initialize the histogram. In other words, the segment size of the histogram is 256. Subsequently, this acquired cumulative histogram is latched through latch circuit 32 to interpolation circuit 33. Then, new input luminance signals are interpolated via interpolation circuit 33 based upon a previously obtained cumulative histogram in real time. The interpolation is performed in real time in the sense that there is no delay circuit for an input of interpolation circuit 33 to achieve improvement of the input luminance signal by the cumulative histogram. For example, if cumulative histogram 31 is initialized, then input luminance signal data regarding pixels P1–P256 will be input to the cumulative histogram circuit 31 and passed through interpolation circuit 33. Subsequently, input luminance signal information regarding pixels P257–P512 will similarly be input to cumulative histogram circuit 31 and interpolation circuit 33. However, as the input luminance signal information regarding pixels P257–P512 is passed through interpolation circuit 33, this information will be interpolated based upon the cumulative histogram obtained with respect to pixels P1-P256. Accordingly, the input luminance signal may be interpolated in real time, based upon a cumulative histogram obtained with respect to previous data.

The present invention overcomes the difficulties regarding luminance distribution in the prior art, as will be apparent from the discussion herein.

For example, if the luminance distribution of the input luminance signals has a large number of dark signals, the output signals of the cumulative histogram circuit 31 describes an upwardly projecting graph as depicted in FIG. 4. The characteristics of this cumulative histogram are inputted to the interpolation circuit 33 through the latch circuit 32, and the luminance signal inputted to the interpolation circuit 33 is corrected to generate the output signal which is interpolated by this straight line. Accordingly, if the input luminance signal contains a large number of dark signals, the dark portion is stretched or extended in a bright direction and outputted.

As described above, a picture quality improving circuit which expands the dynamic range of the luminance signal by the luminance distribution of the input luminance signal can be obtained by providing the cumulative histogram circuit, receiving the digitally encoded input luminance signal, for obtaining the cumulative histogram, the latch circuit for temporarily storing the histogram signals obtained by the cumulative histogram circuit, and the interpolation circuit, receiving the input luminance signal and the output histogram signals of the latch circuit, for interpolating the input signal into the line graph similar to the input histogram signal.

In the first embodiment described above, division is made into four parts for the ease of explanation, but cumulative histograms of a greater number of divisions may be acquired by increasing the number of divisions and conducting more delicate control.

In the first embodiment, the input luminance signal has 256 steps (8-bits), by way of example. Therefore, the cumulative histogram of one segment is obtained by performing the counting operation 256 times. However, the cumulative histogram may be obtained by effecting this operation N times and then dividing the resulting cumulative histograms by N so as to obtain an average. In such a case, a cumulative histogram having higher stability may be obtained due to the integration effect even if any fluctuation exists in the input luminance signal.

Although continuously obtained input luminance signals are measured in the first embodiment, the data throughout the entire screen can be effectively used if sampling is carried out with suitable intervals so that 256 sampling points exist throughout the screen. An illustration of such an embodiment is shown in FIG. 5.

Figure 5:
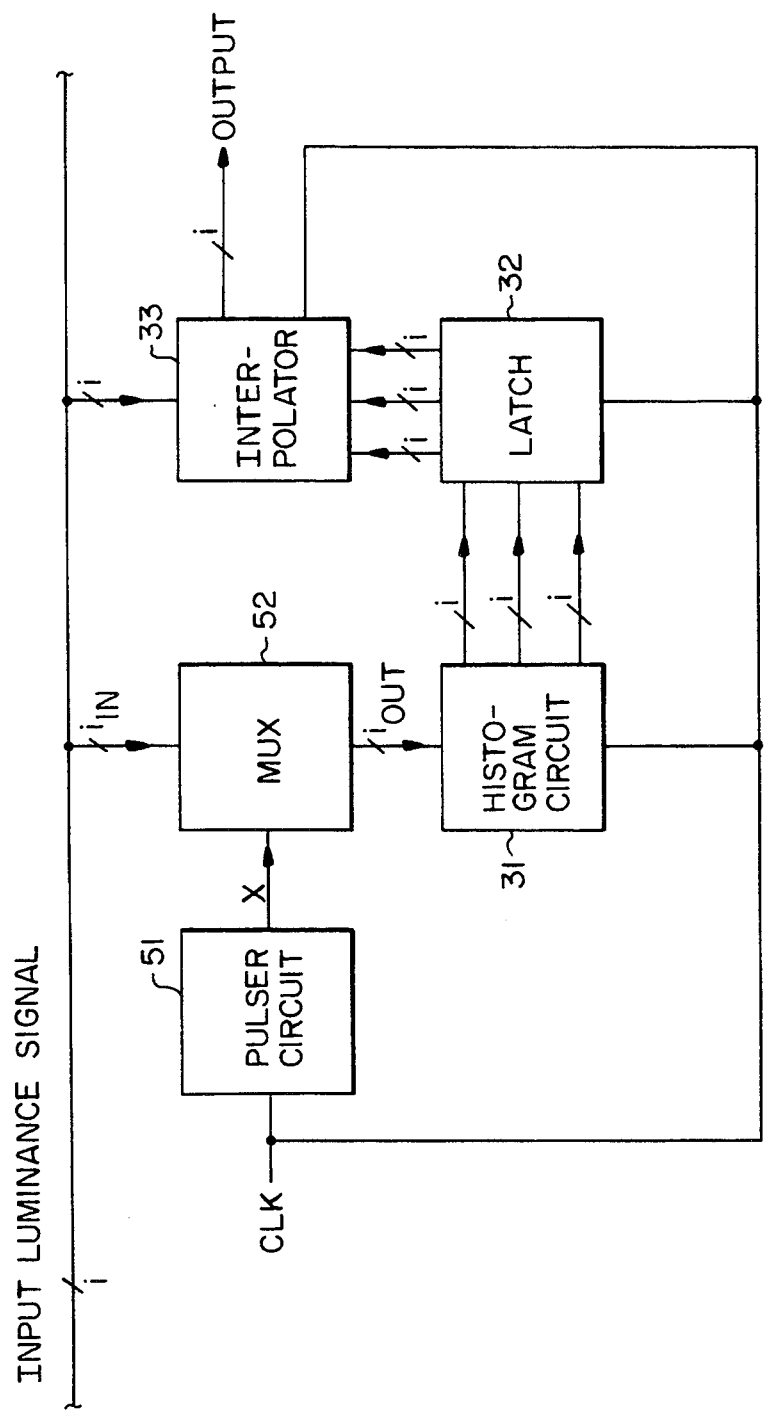
FIG. 5 is a block diagram of a picture quality correction circuit according to a fourth embodiment of the present invention.

The circuit of FIG. 5 is similar to FIG. 3, except additional structure provided for selectively sampling input luminance signal data to be inputted to histogram circuit 31. For example, the circuit of FIG. 5 may be employed to obtain a cumulative histogram based upon luminance data for every 10th, 100th, or 150th pixel (or any other pixel spacing) so as to obtain a cumulative histogram with respect to a portion of a frame, a full frame, or a plurality of frames. In FIG. 5, pulse circuit 51 is associated with a clock signal having a predetermined relationship with the input luminance signal. Pulse circuit 51 generates an enablement signal X every predetermined number of cycles, which signal is received by the multiplexer 52. In response to the enablement signal X, multiplexer 52 allows the input luminance signal to pass therethrough into histogram circuit 31. In the absence of enablement signal X, the input luminance signal is not passed through the multiplexer 52. The remainder of the circuit operates in a similar manner to the circuit of FIG. 3. The arrangement of FIG. 5 provides for real time interpolation of an input luminance signal based upon a previously obtained cumulative histogram.

Furthermore, a system similar to FIG. 5 may also be modified as described above, such that the histogram circuit 31 obtains and adds together N cumulative histograms and then divides the resulting cumulative histogram by N so as to obtain an average cumulative histogram. For example, in one preferred embodiment 9216 samples are obtained for every field (i.e. half a frame) so as to obtain an average cumulative histogram. That is, 36 different cumulative histograms are obtained with each histogram having 256 samples, with the result being divided by 36. According to such an embodiment, a cumulative histogram is developed for a first half of a frame, and this cumulative histogram is then used to interpolate the input luminance signal regarding the second half of the frame. Simultaneously, a new histogram is being developed with respect to the input luminance signal data of the second half of the frame which will be used to interpolate the input luminance signal data of a first half of a subsequent frame. Therefore, it is clear that the histogram is continually updated.

Figure 6:
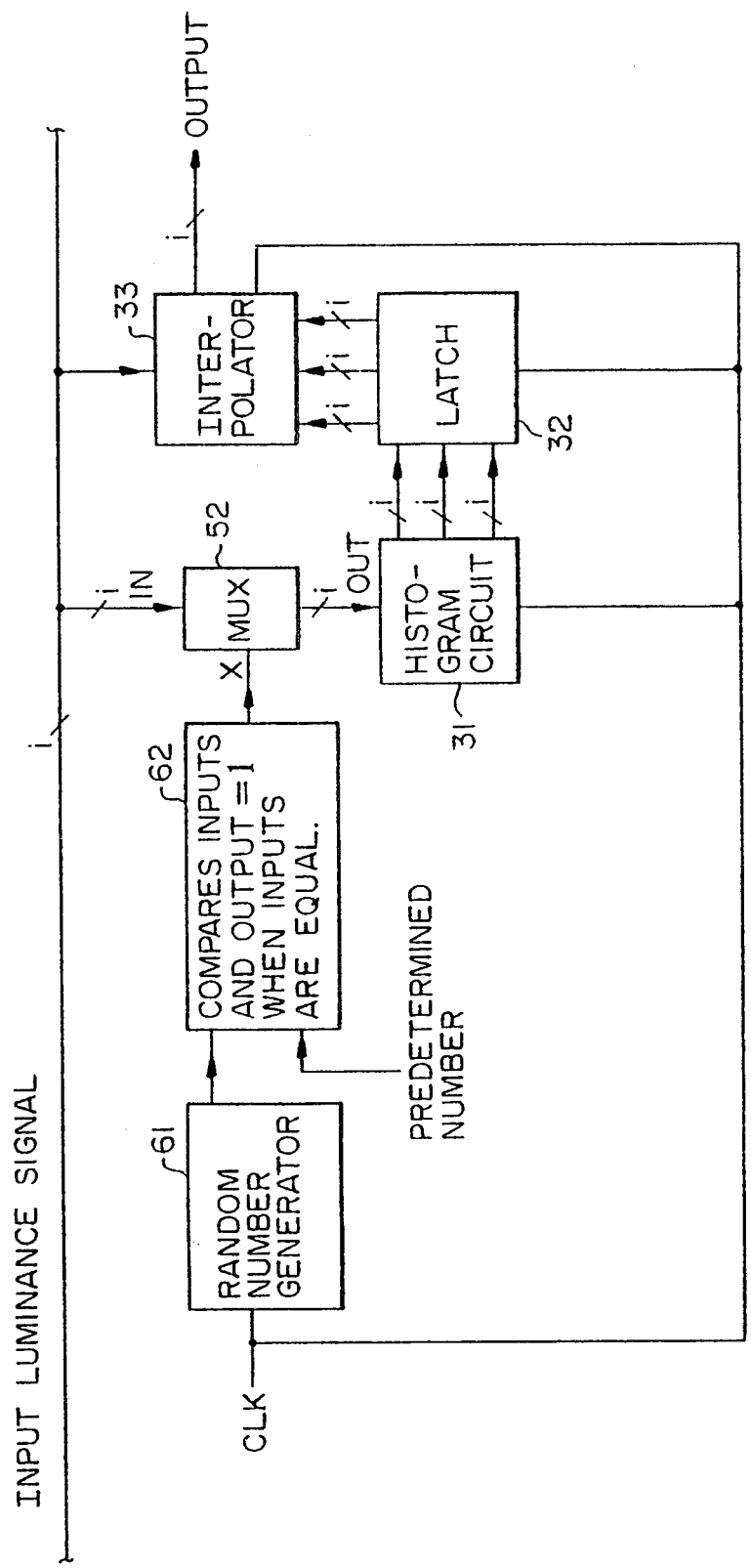
FIG. 6 is a block diagram of a picture quality correction circuit according to a fifth embodiment of the present invention.

Alternatively, the sampling may be done randomly. FIG. 6 shows an embodiment where the sampling is performed on a random basis. FIG. 6 operates similarly to FIG. 5, except pulse circuit 51 is replaced with random number generator 61 and logic circuit 62. Random number generator 61 generates random numbers and supplies them to circuit 62. Logic circuit 62 only generates enablement signal X when the input is equal to a predetermined number.

With respect to embodiments of the invention wherein a plurality of histograms are obtained and then averaged, two different approaches may be used. First, after an averaged cumulative histogram has been obtained, the entire histogram circuit may be cleared and N new cumulative histograms may be obtained and then averaged by dividing by N. Secondly, a "sliding" average may be obtained, wherein after an initial average cumulative histogram has been obtained as describe above, a new average cumulative histogram may be obtained by adding the second to (N+1)th obtained histogram together and dividing by N. The next average histogram is obtained by adding the third to (N+2)th obtained histogram and dividing by N, and subsequent average histograms are obtained correspondingly.

If the data of the full surface of the screen are used to obtain a cumulative histogram in the first embodiment as described above, an error may occur in the following case. If a motion picture of a panorama size is vertically cut by black and is transmitted in so-called "letter box" style, for example, the transmitted image includes a large number of black portions which are not part of the scene to be displayed on the screen, and an incorrect cumulative histogram will be obtained if the data of the full surface of the screen are employed. In such a case, the above operation should be carried out only on the luminance signals at the center portion of the screen and the upper and lower portions of the screen should be masked. Such masking can be carried out by inhibiting the counting operations of the counters 12, 14, 16 (inhibit signal input terminals not shown) for predetermined time periods in accordance with vertical and horizontal synchronous signals of the video signal.

As described above, the present invention provides a picture quality improving circuit for expanding the dynamic range of the luminance signal according to the luminance distribution of the input luminance signal, which comprises the cumulative histogram circuit receiving the digitally encoded input luminance signal for obtaining the cumulative histogram, the latch circuit for temporarily storing the histogram signal obtained in the cumulative histogram circuit, and the interpolation circuit receiving the input luminance signal as well as the output histogram signal of the latch circuit for interpolating the input signal into the line graph similar to the histogram signal.

What is claimed is:

1. A picture quality improving circuit, comprising:
   means for receiving an input signal having a level variable within a predetermined range;
   means for obtaining a cumulative histogram of said input signal for a predetermined time period, said cumulative histogram representing relationships between a plurality of selected levels of said input signal and corresponding histogram values which represent a number of samples of said input signal having levels less than a corresponding one of said selected levels;
   a first selector for receiving said input signal and determining a first one of said selected levels which is closest to and greater than a level of the input signal and outputting a first one of said histogram values corresponding to the level of said first one of said selected levels;
   a second selector for receiving said input signal and determining a second one of said selected levels which is closest to and less than or equal to the level of the input signal and outputting a second one of said histogram values corresponding to the level of said second one of said selected levels; and
   calculation means for calculating a level of a corrected signal corresponding to said input signal by interpolating the level of said input signal between said first one and said second one of said histogram values.

2. A picture quality improving circuit according to claim 1, wherein:
   said input signal is a digitally encoded input signal having i bits (where i is an integer larger than 1);
   values of said selected levels equal 0, 1, 2, . . . $2^m$ times, respectively, up to $2^{i-m}$ (where m is an integer greater than 0 and less than i);
   said first and second selectors determine said first and second ones of said histogram values, respectively, based on the most significant m bits of said input signal; and
   said calculation means comprises a subtraction circuit for calculating a difference between said first and second ones of said histogram values, bit shifting means for shifting each bit of said difference in a lower direction by (i−m) places, a multiplication circuit for multiplying an output of said bit shifting means by a signal comprising the least significant (i−m) bits of said input signal, and an addition circuit for adding said second one of said histogram values and an output of said multiplication circuit so as to obtain the level of said corrected output signal.

3. A picture quality improving circuit according to claim 1, wherein said means for obtaining a cumulative histogram comprises:
   a plurality of comparison circuits for receiving said input signal and comparing a level of each of said samples of said input signal with said selected levels and for generating output pulses, respectively, when the level of a one of said samples of said input signal is less than a respective one of said selected levels; and
   a plurality of counters for counting said output pulses of said comparison circuits, respectively, for said predetermined time period to carry out a sampling operation to obtain counted numbers representinq said histogram values, and outputting said counted numbers.

4. A picture quality improving circuit according to claim 2, wherein said means for obtaining a cumulative histogram comprises:
   a plurality of comparison circuits for receiving said input signal and comparing a level of each of said samples of said input signal with said selected levels and for generating output pulses, respectively, when the level of a one of said samples of said input signal is less than a respective one of said selected levels; and
   a plurality of counters for counting said output pulses of said comparison circuits, respectively, for said predetermined time period to carry out a sampling operation to obtain counted numbers representing said histogram values, and outputting said counted numbers.

5. A picture quality improving circuit according to claim 3, wherein said sampling operation includes 256 samples obtained at predetermined intervals such that said comparison circuits receive a number of said samples of said input signal corresponding to a full surface of a screen.

6. A picture quality improving circuit according to claim 4, wherein i equals 8 and said sampling operation includes 256 samples obtained at predetermined intervals such that said comparison circuits receive a number of said samples of said input signal corresponding to a full surface of a screen, and a histogram value 256 corresponding to a selected level $2^i$ is set as 255 so that said histogram values may be represented in 8 bits.

7. A picture quality improving circuit according to claim 3, further comprising means for limiting said sampling operation to be carried out only at a center portion of a screen so that upper and lower portions of said screen are masked.

8. A picture quality improving circuit according to claim 4, further comprising means for limiting said sampling operation to be carried out only at a center portion of a screen so that upper and lower portions of said screen are masked.

* * * * *